United States Patent Office 3,640,989
Patented Feb. 8, 1972

3,640,989
NOVEL BINARY CATALYST SYSTEM FOR THE POLYMERIZATION OF DIOLEFINS
Morford C. Throckmorton, Akron, Ohio, assignor to The Goodyear Tire & Rubber Company, Akron, Ohio
No Drawing. Filed May 2, 1969, Ser. No. 821,499
Int. Cl. C08d 3/06
U.S. Cl. 260—94.3                    8 Claims

ABSTRACT OF THE DISCLOSURE

There is disclosed a process for the polymerization of butadiene and butadiene in mixture with other conjugated diolefins to form polymers containing a high portion of the butadiene units in the cis-1,4 configuration comprising contacting at least one diolefin under polymerization conditions with a binary catalyst system comprising (A) at least one compound selected from a group consisting of organonickel and organocobalt compounds of fluorine containing (1) carboxylic acids, (2) aldehydes, (3) ketones and (4) phenols, and (B) at least one organometallic compound wherein the metal is selected from Groups I, II and III of the Periodic Table.

---

This invention is directed to methods of polymerizing butadiene and butadiene in mixture with other conjugated diolefins to form polymers having a high content of cis-1,4 addition. It is also directed to catalyst systems useful for this purpose.

Polymers of butadiene or butadiene in mixture with conjugated diolefins containing a high portion of the butadiene units in the cis-1,4 configuration possess properties which make them useful as synthetic rubbers and for providing high impact resistance to plastics.

It is an object of this invention to provide a method whereby butadiene can be polymerized to a high content of cis-1,4 structure, that is, a cis-1,4 content greater than 85 percent. Another object is to provide a catalyst system by which these polymerizations may be accomplished. Another object is to form copolymers of isoprene or other conjugated diolefins and butadiene, in which the repeat units derived from butadiene have a high content of cis-1,4 structure. Other objects will become apparent as the description proceeds.

The catalytically promoted polymerization of diolefins is well known to the art. Many catalysts that have been proposed for the polymerization of 1,3 dienes are catalysts of either the Ziegler-Natta type or alkali metal catalysts such as butyllithium.

Usually these prior art catalysts have yielded polydienes having mixed structures, that is, mixtures of cis-1,4, trans-1,4, 1,2- and 3,4-structure. However, several prior art catalyst systems have been shown to give predominantly the desirable cis-1,4 structure. One such system is a ternary catalyst system comprised of (1) an alkylaluminum halide, (2) a cerium metal chelate compound and (3) a trialkylaluminum or alkylaluminum hydride. Another prior art catalyst system, capable of producing polydienes having a high content of cis-1,4 structure, is also a ternary catalyst system comprised of (1) at least one organometallic compound wherein the metal is selected from a class consisting of metals of Groups I, II and III of the Periodic Table, (2) at least one organonickel salt or organonickel complex compound and (3) at least one compound selected from a class consisting of boron trifluoride and complex compounds thereof.

The present catalyst system differs markedly from these prior art catalyst systems in at least two major respects. The first is that the catalyst system, constituting this invention, is not a three component catalyst system but rather a two component catalyst system. The second major difference resides in the type of organonickel and organocobalt compounds employed as opposed to the types of organonickel and organocobalt compounds that are normally employed. The organonickel and organocobalt compounds employed in the practice of the present invention are organonickel and organocobalt compounds of fluorine containing carboxylic acids, aldehydes, ketones and phenols.

Thus, according to the present invention, butadiene or butadiene in combination with other conjugated diolefins is polymerized by contact, under solution polymerization conditions, with a catalyst system comprising (A) at least one compound selected from a group consisting of organonickel and organocobalt compounds of fluorine containing (1) carboxylic acids, (2) aldehydes and (3) ketones and (4) phenols and (B) at least one organometallic compound wherein the metal is selected from Gorups I, II and III of the Periodic Table.

The organonickel and organocobalt compounds of fluorine containing carboxylic acids, aldehydes, ketones and phenols useful in the practice of this invention can be compounds of the said metal with a mono- or bidentate organic ligand containing up to 20 carbon atoms. "Ligand" is defined as an ion or molecule bound to and considered bonded to a metal atom or ion. Monodentate means having one position through which covalent or coordinate bonds with the metal may be formed; bidentate means having two positions through which covalent or coordinate bonds with the metal may be formed.

Representative examples of organonickel compounds of fluorine containing carboxylic acids include nickel (II) trifluoroacetate, nickel (II) pentafluoroproprionate, nickel (II) perfluorovalerate, nickel (II) perfluorooctanoate, nickel (II) perfluorobenzoate, nickel (II) perfluorosalicylate and the like. Representative examples of the organonickel compounds of fluorine-containing aldehydes include nickel (II) perfluorosalicyl aldehyde, nickel (II) perfluoro-2-hydroxy-1-naphthaldehyde and the like. Representative examples of organonickel compounds of fluorine containing ketones include nickel (II) hexafluoroacetylacetonate, nickel (III) trifluoroacetylacetonate, nickel (II) perfluorohydroxy benzophenone and the like and a representative example of an organonickel compound of a fluorine containing phenol is nickel (II) tetrafluoro-1,2-dihydroxybenzene. The preferred organonickel compound is nickel (II) hexafluoroacetylacetonate.

Representative examples of the organocobalt compounds of fluorine containing carboxylic acids include cobalt (II) trifluoroacetate, cobalt (II) pentafluoropropionate. cobalt (II) perfluorovalerate, cobalt (II) perfluorooctanoate, cobalt (II) perfluorobenzoate, cobalt (II) perfluorosalicylate and the like. Representative examples of organocobalt compounds of fluorine containing aldehydes include cobalt (II) perfluorosalicyl aldehyde and the like. Representative examples of organocobalt compounds of fluorine containing ketones include cobalt (II) hexafluoroacetylacetonate, cobalt (II) trifluoroacetylacetonate, cobalt (II) perfluorohydroxy benzophenone and the like and a representative example of an organocobalt compound of a fluorine containing phenol is cobalt (II) tetrafluoropyrocatechol. The preferred organocobalt compound is cobalt (II) hexafluoroacetylacetonate.

By the term "perfluoro" is meant that all of the hydrogen atoms, attached to non-functional group carbon atoms, have been replaced with fluorine.

When considering the organometallic compounds containing metals from Groups I, II and III, it is preferred for this invention to use organoaluminum compounds, organomagnesium compounds, organozinc compounds and organolithium compounds.

By the term "organoaluminum compound" is meant any organoaluminum compound responding to the formula:

in which $R_1$ is selected from a group consisting of hydrogen (fluorine and a monovalent hydrocarbon radical such as alkyl, alkenyl, aryl, aralkyl, alkaryl, cycloalkyl and alkoxy containing from about 1 to about 20 carbon atoms and $R_2$ and $R_3$ are monovalent hydrocarbon radicals selected from a group consisting of alkyls, alkenyls, aryls, aralkyls, alkaryls and cycloalkyls containing from 1 to about 20 carbon atoms. Representative of the compounds responding to the formula set forth above are: diethylaluminum fluoride, di-n-propylaluminum fluoride, di-n-butylaluminum fluoride, diisobutylaluminum fluoride, dihexylaluminum fluoride, dioctylaluminum fluoride and diphenylaluminum fluoride. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenyl ethylaluminum hydride, phenyl n-propylaluminum hydride, p-tolylethylaluminum hydride, p-tolyl n-propylaluminum hydride, p-tolyl isopropylaluminum hydride, benzyl ethylaluminum hydride, and other organoaluminum hydrides. Also included are ethoxydiethylaluminum, ethoxydipropylaluminum, ethoxydiisobutylaluminum and other alkoxydialkylaluminum compounds. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant first, any organomagnesium complex responding to the formula $R_aMgX_b$ where R is a monovalent hydrocarbon radical such as alkyl, alkenyl, aryl, alkaryl, aralkyl and cycloalkyl containing from 1 to about 20 carbon atoms; X is a halogen, and "a" and "b" are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also, "organomagnesium compounds" means any organomagnesium compound or any organomagnesium halide of the Grignard type corresponding to the formulae $R_2Mg$ or $RMgY$ where R may be alkyl, alkenyl, aryl, aralkyl or alkaryl and Y is fluorine or $R'R''Mg$ where R' may be alkyl, alkenyl, aryl or alkaryl and R'' may be either alkyl, alkenyl, aryl, aralkyl or alkaryl. Representative among the compounds responding to these formuae are diethylmagnesium, dipropylmagnesium, ethylmagnesium fluoride and phenylmagnesium fluoride.

By the term "organozinc compound" is meant any organozinc compound responding to the formula $R_2Zn$ where R is a monovalent hydrocarbon radical such as alkyl, alkenyl, aryl, aralkyl, alkaryl and cycloalkyl containing from about 1 to about 20 carbon atoms. Representative among such compounds are diethylzinc, dibutylzinc or diphenylzinc.

By the term "organolithium compounds" is meant any organolithium compound responding to the formula R—Li, where R is an alkyl, alkaryl, aralkyl or aryl group. Representative among the compounds responding to the formula set forth above are ethyllithium, propyllithium, n-, sec- or t-butyllithium, hexyllithium, 2-phenyl-n-hexyllithium, phenyllithium and the like. Also, the organolithium aluminum compounds may be used. These compounds respond to the formula $R'R''_3LiAl$ where R' and R'' may be alkyl, alkaryl or aralkyl groups and R' and R'' may or may not be the same group. Representative of these compounds are n-butyltriisobutyllithium aluminum, tetrabutyllithium aluminum, butyltriethyllithium aluminum, tetraisobutyllithium aluminum and tetraethyllithium aluminum.

Representative of other organometallic compounds with metals selected from Group I, II and III of the Periodic System are compounds containing at least one of the metals, sodium, potassium, calcium, beryllium, cadmium and mercury combined with at least one organic radical selected from the group consisting of alkyls, alkaryls, aralkyls and aryls.

The two component catalyst systems of this invention has shown polymerization activity over a wide range of catalyst concentrations and catalyst ratios. Apparently, the two catalyst components interact to form the active catalyst. As a result, the optimum concentraion for any one catalyst component is dependent upon the concentration of the other catalyst component. Although polymerization will occur over a wide range of catalyst concentrations and ratios, polymers having the most desirable properties are obtained over a narrower range. It has been found that polymerization will occur when the mole ratio of the (B) component of the catalyst system to the (A) component of the catalyst system ranges from about 1/1 to about 30/1. The preferred (B)/(A) mole ratio ranges from about 3/1 to about 20/1.

The two catalyst components may be charged to the polymerization system as separate catalyst components in either a stepwise or a simultaneous manner, sometimes called "in situ." The catalyst may also be "preformed" outside the polymerization system whereby the catalyst components are mixed in the absence of the butadiene, either with or without an inert diluent and the resulting complete blend then added to the polmerizaion system.

The catalyst may also be "preformed" outside the polymerization system whereby all the catalyst components are mixed in the presence of small amounts of butadiene or other conjugated diolefin. The amount of the butadiene present can vary over a wide range but must be a catalytic amount. For good results the molar ratio of butadiene to the (A) catalyst component can range from about 1/1 to about 3000/1. A preferred mole ratio of butadiene to the (A) catalyst component ranges from about 8/1 to about 500/1.

The concentration of the total catalyst system employed depends on a number of factors such as purity of the system, polymerization rate desired, temperature and other factors, therefore, specific concentrations cannot be set forth except to say that catalytic amounts are used. Some specific concentrations and ratios which produce polymers having desirable properties will be illustrated in the examples given herein to explain the teachings of this invention.

In general, the polymerization of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Prefererd solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employed in the practice of this invention have not been found to be critical and may vary from a low temperature, such as $-10°$ C. or below, up to high temperatures of $100°$ C. or higher. However, a more desirable temperature range is between about $0°$ C. and about $60°$ C. Ambient pressures are usually used but higher or lower pressures may be employed.

As employed in this specification, inherent viscosity, $[\eta]$, is defined as the natural logarithm of the relative viscosity at $30°$ C. divided by the polymer concentration for a 0.5 percent (wt./vol.) solution in toluene and is expressed in deci-liters per gram (dl./g.).

The cis-1,4 structure of the polymers was determined by infrared analysis.

The practice of this invention is further illustrated by reference to the following examples which are intended to be representative rather than restrictive of the scope of the invention.

EXAMPLE I

A purified butadiene (BD) in benzene solution containing 100 grams (g.) of butadiene per liter of solution was charged into 4-ounce bottles. Nitrogen was flushed over the surface of the premix and the catalyst charged "in situ" in the amounts shown in Table I. The "in situ" catalyst employed consisted of triethylaluminum (TEAL) and nickel (II) hexafluoroacetylacetonate $$[Ni(F_6C_5HO_2)_2]$$

The sealed bottles were tumbled end-over-end in a water bath. The polymerizations were deactivated by the addition of a suitable stopping agent and an antioxidant. Table I contains representative data.

TABLE I.—SOLVENT—BENZENE

| Exp. No. | Millimoles/100 g. BD | | Temp., °C. | Time, hrs. | Weight percent yield | $[\eta]$ |
|---|---|---|---|---|---|---|
| | TEAL | Ni(F₆C₅HO₂)₂ | | | | |
| 1 | 0.6 | 0.1 | 50 | 18 | 49 | 1.2 |
| 2 | 0.6 | 0.1 | 50 | 43 | 70 | 1.3 |
| 3 | 0.6 | 0.2 | 50 | 43 | 62 | 1.4 |
| 4 | 0.8 | 0.2 | 50 | 43 | 74 | ªND |
| 5 | 0.8 | 0.25 | 50 | 43 | 73 | ND |
| 6 | 1.0 | 0.15 | 50 | 18 | 74 | 1.0 |
| 7 | 1.5 | 0.15 | 50 | 18 | 86 | ND |
| 8 | 0.4 | 0.05 | 25 | 43 | 31 | ND |
| 9 | 0.6 | 0.10 | 25 | 43 | 56 | 1.4 |
| 10 | 0.8 | 0.15 | 25 | 43 | 68 | 1.2 |
| 11 | 1.0 | 0.20 | 25 | 43 | 73 | 1.0 |
| 12 | 1.0 | 0.30 | 25 | 43 | 68 | ND |

ª ND=not determined.

The cis-1,4 content of the polymer produced in Experiment No. 3 was found to be 95%.

EXAMPLE II

A series of polymerizations was carried out similar to Example I except that hexane was used as the reaction solvent in place of benzene. The polymerizations were carried out at $50°$ C. for 45 hours. All data are given in Table II below.

TABLE II

| Exp. No. | Millimole/100 g. BD | | Weight percent yield | $[\eta]$ |
|---|---|---|---|---|
| | TEAL | Ni(F₆C₅HO₂)₂ | | |
| 1 | 0.4 | 0.05 | 26 | ªND |
| 2 | 0.6 | 0.15 | 38 | 1.84 |
| 3 | 0.8 | 0.20 | 44 | 1.80 |
| 4 | 1.0 | 0.20 | 56 | ND |

ª ND=not determined.

EXAMPLE III

A series of polymerizations was carried out similar to Example I except that diethylaluminum hydride (DEAH) was employed in place of triethylaluminum (TEAL). The table below contains all pertinent data.

TABLE III.—SOLVENT—BENZENE

| Exp. No. | Millimole/100 g. BD | | Temp., °C. | Time, hrs. | Weight percent yield |
|---|---|---|---|---|---|
| | DEAH | Ni(F₆C₅HO₂)₂ | | | |
| 1 | 0.6 | 0.10 | 50 | 17 | 68.0 |
| 2 | 0.8 | 0.10 | 50 | 17 | 46.0 |
| 3 | 0.8 | 0.15 | 50 | 17 | 75.0 |
| 4 | 0.8 | 0.20 | 50 | 17 | 63.0 |
| 5 | 0.6 | 0.05 | 25 | 65 | 37.0 |
| 6 | 0.6 | 0.10 | 25 | 21 | 57.0 |
| 7 | 0.8 | 0.15 | 25 | 21 | 65.0 |

The inherent viscosities of the polymers produced in Experiment Nos. 1, 6 and 7 were found to be 1.2, 1.4 and 1.2 deciliters/gram (dl./g.) respectively.

EXAMPLE IV

A series of polymerizations was carried out similar to Example I except that the catalyst was preformed in the presence of a small amount of butadiene prior to addition to the polymerization premix. The catalyst was preformed by adding to a 4-ounce bottle 17.0 milliliters (ml.) of dry benzene, 2.3 ml. (4.26 millimoles) of butadiene (BD), 5.15 ml. (1.29 millimoles) of 0.25 molar solution of triethylaluminum (TEAL) in benzene and 9.5 ml. (0.427 millimole) of 0.05 molar nickel (II) hexafluoroacetylacetonate $[Ni(F_6C_5HO_2)_2]$ in that order. The polymerizations were carried out for 43 hours. The table below gives all pertinent data.

TABLE IV.—SOLVENT—BENZENE ª

| Exp. No. | Millimoles/100 g. BD | | | Temp., °C. | Weight percent yield | $[\eta]$ |
|---|---|---|---|---|---|---|
| | BD | TEAL | Ni(F₆C₅HO₂)₂ | | | |
| 1 | 2.0 | 0.6 | 0.2 | 50 | 75 | 1.4 |
| 2 | 3.0 | 0.9 | 0.3 | 50 | 73 | ᵇND |
| 3 | 2.0 | 0.6 | 0.2 | 25 | ᶜ75 | 1.5 |
| 4 | 3.0 | 0.9 | 0.3 | 25 | 57 | 1.9 |
| 5 | 2.0 | 0.6 | 0.2 | 0 | 29 | ND |
| 6 | 3.0 | 0.9 | 0.3 | 0 | 58 | 1.4 |
| 7 | 4.0 | 1.2 | 0.4 | 0 | 67 | ND |
| 8 | 2.0 | 0.6 | 0.2 | 50 | 74 | 1.8 |
| 9 | 3.0 | 0.9 | 0.3 | 50 | 84 | 2.2 |
| 10 | 4.0 | 1.2 | 0.4 | 50 | 77 | 2.0 |

ª The solvent employed in Experiment Nos. 8, 9 and 10 was hexane.
ᵇ ND=not determined.
ᶜ Polymerization time=18 hours.

The cis-1,4 content of the polymers produced in Experiment Nos. 3 and 8 was found to be 96% for both polymers.

EXAMPLE V

A series of polymerizations was carried out similar to Example IV except that instead of employing a preformed catalyst having a BD/Ni(F₆C₅HO₂)₂ mole ratio of 10/1, two preformed catalysts having BD/Ni(F₆C₅HO₂)₂ mole ratios of 40/1 and 60/1, respectively, were employed. In addition, the preformed catalyst having the $$BD/Ni(F_6C_5HO_2)_2$$

mole ratio of 40/1 also has a TEAL/Ni(F₆C₅HO₂)₂ mole ratio of about 4.7/1 as opposed to the mole ratio of 3/1 employed in the other preformed catalyst examples, including Example IV above. All polymerizations were carried out for 38 hours except Experiment No. 1, which was polymerized for 18 hours. Table V contains all pertinent data.

TABLE V.—SOLVENT—BENZENE

| Exp No | Millimoles/100 g BD | | | Temp, °C | Weight percent yield | $[\eta]$ |
|---|---|---|---|---|---|---|
| | BD | TEAL | Ni(F₆C₅HO₂)₂ | | | |
| 1 | 6.0 | 0.7 | ª0.15 | 50 | 76 | 1.8 |
| 2 | 9.0 | 0.45 | ᵇ0.15 | 25 | 46 | 1.6 |
| 3 | 18.0 | 0.90 | 0.30 | 25 | 77 | ᶜND |
| 4 | 18.0 | 0.90 | 0.30 | 50 | 82 | ND |

ª BD/Ni(F₆C₅HO₂)₂=40/1
ᵇ BD/Ni(F₆C₅HO₂)₂=60/1
ᶜ ND=not determined

The cis-1,4 content of the polymer produced in Experiment No. 1 was found to be 96%.

What is claimed is:

1. A process for the polymerization of butadiene and butadiene in mixture with other conjugated diolefins to form polymers containing greater than 85 percent of the butadiene units in the cis-1,4 configuration comprising contacting at least one diolefin under polymerization conditions with a binary catalyst system comprising (A) at least one compound selected from a group consisting of organonickel and organocobalt compounds of fluorine containing (1) carboxylic acids, (2) aldehydes, (3) ketones and (4) phenols, and (B) at least one organometallic compound wherein the metal is selected from Groups I, II and III of the Periodic Table and wherein the mole ratio of catalysts component (B) to catalyst component (A) ranges from about 1/1 to about 30/1.

2. A rocess according to claim 1 in which the diolefin is 1,3-butadiene.

3. A process according to claim 1 in which the (B) catalyst component is an organoaluminum compound.

4. A process according to claim 3 in which the organoaluminum compound is a trialkylaluminum.

5. A process according to claim 1 in which the (A) catalyst component is selected from a group consisting of organonickel compounds of fluorine containing (1) carboxylic acids, (2) aldehydes, (3) ketones and (4) phenols.

6. A process according to claim 1 in which the organonickel compound is nickel (II) hexafluoroacetylacetonate.

7. A process according to claim 1 in which the mole ratio of catalyst component (B) to catalyst component (A) ranges from about 3/1 to about 20/1.

8. A catalyst composition comprising (A) at least one compound selected from a group consisting of organonickel compounds of fluorine containing (1) carboxylic acids, (2) aldehydes, (3) ketones and (4) phenols and (B) at least one organoaluminum compound.

References Cited

UNITED STATES PATENTS

| | | | |
|---|---|---|---|
| 3,215,682 | 11/1965 | Farrar et al. | 260—94.3 |
| 3,431,248 | 3/1969 | Kanbara et al. | 260—94.3 |
| 3,458,493 | 7/1969 | Gaeth et al. | 260—94.3 |
| 3,484,425 | 12/1969 | Yamawaki et al. | 260—94.3 |
| 3,379,704 | 4/1968 | Winter et al. | 260—94.3 |

FOREIGN PATENTS

| | | | |
|---|---|---|---|
| 916,000 | 1/1963 | Great Britain | 260—94.3 |
| 1,144,922 | 3/1963 | Germany | 260—94.3 |

JOSEPH L. SCHOFER, Primary Examiner

R. A. GAITHER, Assistant Examiner

U.S. Cl. X.R.

252—429 A; 260—82.1